(12) United States Patent
Akhmetsafin et al.

(10) Patent No.: US 7,646,673 B2
(45) Date of Patent: Jan. 12, 2010

(54) WAVE ANALYSIS USING PHASE VELOCITY PROCESSING

(75) Inventors: Rais Akhmetsafin, Ufa (RU); Vladimir Dubinsky, Houston, TX (US); Douglas J. Patterson, Spring, TX (US)

(73) Assignee: Baker Hughes Incorporated, Houston, TX (US)

( * ) Notice: Subject to any disclaimer, the term of this patent is extended or adjusted under 35 U.S.C. 154(b) by 129 days.

(21) Appl. No.: 11/606,193

(22) Filed: Nov. 29, 2006

(65) Prior Publication Data

US 2008/0123468 A1 May 29, 2008

(51) Int. Cl.
*G01V 1/38* (2006.01)

(52) U.S. Cl. ............................. 367/24; 367/40
(58) Field of Classification Search .................... 367/24, 367/40
See application file for complete search history.

(56) References Cited

U.S. PATENT DOCUMENTS

| | | | | |
|---|---|---|---|---|
| 4,794,572 | A | * | 12/1988 | Sondergeld et al. ........... 367/31 |
| 5,181,171 | A | * | 1/1993 | McCormack et al. ......... 702/14 |
| 5,278,805 | A | * | 1/1994 | Kimball ........................ 367/32 |
| 5,402,520 | A | * | 3/1995 | Schnitta ........................ 706/16 |
| 5,541,890 | A | * | 7/1996 | Tang ............................. 367/34 |
| 5,594,706 | A | * | 1/1997 | Shenoy et al. ................. 367/76 |
| 5,740,124 | A | * | 4/1998 | Chunduru et al. ............. 367/73 |
| 5,831,934 | A | | 11/1998 | Gill et al. |
| 5,930,730 | A | * | 7/1999 | Marfurt et al. ................. 702/16 |
| 6,023,443 | A | * | 2/2000 | Dubinsky et al. ............. 367/76 |
| 6,188,961 | B1 | * | 2/2001 | Mandal .......................... 702/6 |
| 6,427,124 | B1 | * | 7/2002 | Dubinsky et al. ............. 702/9 |
| 6,501,703 | B2 | * | 12/2002 | Zhou et al. .................... 367/38 |
| 6,581,010 | B2 | | 6/2003 | Dubinsky et al. |
| 6,691,036 | B2 | * | 2/2004 | Blanch et al. ................. 702/11 |
| 6,748,329 | B2 | * | 6/2004 | Mandal ........................ 702/14 |
| 6,907,349 | B2 | * | 6/2005 | Mandal ........................ 702/14 |
| 6,930,616 | B2 | * | 8/2005 | Tang et al. ............... 340/854.4 |
| 7,089,119 | B2 | * | 8/2006 | Mandal ........................ 702/11 |
| 2005/0226098 | A1 | * | 10/2005 | Engels et al. ................. 367/31 |

OTHER PUBLICATIONS

Kozak et al. Phase Velocity Processing for Acoustic Logging-While-Drilling Full Waveform Data. pp. 1-12.*
Koza et al. Estimation of Formation Shear Slowness Using Phase Velocity and Semblance Method—Comparative Studies. pp. 1-4.*
Kimball et al. Semblance Processing of Borehole Acoustic Array Data. Geophysics. vol. 49. No. 3. Mar. 1984. pp. 274-281.*
Whitley et al. The First Break Seismic Detection Problem: Representation Issues. Oct. 1997.*

(Continued)

*Primary Examiner*—Mark Hellner
(74) *Attorney, Agent, or Firm*—Bracewell & Giuliani LLP

(57) ABSTRACT

A method and apparatus for processing acoustic data recorded by a subterranean receiver array. The method includes emitting an acoustic signal into a formation, receiving the signal after it passes through the array, and processing the data with semblance and phase velocity processing. Semblance and phase velocity plots are generated and combined into a single plot. The phase velocity processing creates phase separation lines, the phase separation line that crosses the closest contour of the semblance plot is identified. The point where the intersecting phase separation line crosses an associated tool line marks the slowness and travel time that provides maximum coherence.

28 Claims, 7 Drawing Sheets

OTHER PUBLICATIONS

Marek Kozak, Paul Boonen and Doug Seifert, Phase Velocity Processing for Acoustic Logging-While-Drilling full Waveform Data, pp. 1-12.

Marek Z. Kozak and Mirka E. Kozak, Estimation of Formation Shear Slowness Using Phase Velocity and Semblance Method—Comparative Studies, pp. 1-4.

Christopher V. Kimball and Thomas L. Marzetta, Semblance Processing of Borehole Acoustic Array Data, Geophysics, vol. 49, No. 3 (Mar. 1984), pp. 274-281.

* cited by examiner

US 7,646,673 B2

WAVE ANALYSIS USING PHASE VELOCITY PROCESSING

BACKGROUND OF THE INVENTION

1. Field of the Invention

The present disclosure relates to a method and device for evaluating waveforms, including acoustic waveforms. More specifically, the present disclosure relates to a method and a device for evaluating acoustic waves transmitted through a subterranean formation and received by multiple receivers.

2. Description of Related Art

Information concerning the characteristics of subterranean formations can be obtained by investigating acoustic waves that have propagated through at least a portion of the formation. Typically the investigation involves emitting one or more types of wave into the formation at one location, recording the wave at another location after it has passed through the formation, and analyzing how the wave has been affected by its travel through the formation. One common device for this investigation technique is a sonde 10 disposed in a wellbore 5 for transmitting and receiving acoustic signals. As shown, the sonde 10 is tethered to a wireline 9, control commands are provided to the sonde 10 via the wireline 9 and data recorded by the sonde 10 may be transmitted back through the wireline 9 to a surface truck 2. The sonde 10 is shown having an acoustic transmitter $T_1$ for creating and transmitting the acoustic signals into the formation. Also included with the sonde are multiple receivers ($R_1$-$R_M$) disposed along the length of the sonde for receiving the acoustic signals as they have passed through the formation.

FIG. 2 provides an example of acoustic data 12 sampled by the sonde of FIG. 1. The acoustic data 12 comprises waveforms that represent acoustic signals ($A_1$-$A_M$) received by the respective receivers ($R_1$-$R_M$). Each waveform has a noise portion ($N_1$-$N_M$) that represents ambient noise signals recorded by each receiver and a signal portion ($S_1$-$S_M$) that represents the transmitted signal from the transmitter as received by the receivers. The point on the waveform at the beginning of the signal portion is typically referred to as the "first break" or "first arrival" of the acoustic signal. The moveout or slowness of the waveforms can be determined by creating a line 14 that intersects the first break of each waveform and taking the slope of that line 14.

Identifying the first break of a signal can be difficult since the magnitude of the ambient noise often equals or exceeds that of the signal itself. One technique for identifying this break point relies on the assumption that the acoustic signal received by each receiver ($R_1$-$R_M$) will largely have the same form. The technique involves comparing portions of the waveform of the signals ($A_1$-$A_M$), the initial point at which these forms largely match is determined to be the first break. As noted above however, ambient noise or noise from a monitoring device can be received by the receivers and mistaken for the actual signal—this is often referred to as a "false signal" or "false" first break detection. Thus due to the potential for detecting false signals; improved techniques for first break identification are still desired.

BRIEF SUMMARY OF THE INVENTION

The present disclosure includes a method of investigating a subterranean formation, comprising recording acoustic waves from within the formation wellbore, creating a semblance plot based on the recorded waves, generating a phase separation plot, and identifying the first break by combining the phase line plot and the semblance plot. Additionally, a tool line representative of the device used to record the acoustic waves may be added to the plot, and the point at which the too line crosses the phase separation plot may be used to identify the wave slowness, arrival time, and a first break.

The present disclosure includes an analyzer system comprising a downhole tool disposable into a wellbore tubular, a transmitter, a receiver, and an analyzer configured to process data received by the receiver. The analyzer is also capable of creating a coherence plot based on the received data, generating a phase separation plot based on the received data, and identifying the first break by combining the phase line plot and the semblance plot. The acoustic analyzer system may further comprise an information handling system.

DETAILED DESCRIPTION OF THE INVENTION

An embodiment of the method and apparatus provided herein involves processing acoustic waveform data acquired from a receiver array. The processing converts data from a time and amplitude domain into a slowness and arrival time domain. The results of the processing include both a semblance plot and a phase separation plot. By combining these two plots (along with a tool line plot), an intersection can be obtained on the resulting combined plot. The intersection can then be used to accurately identify the position of the first arrival as well as the slowness of the recorded acoustic data.

1. Semblance

For the purposes of discussion herein, it is assumed that seismic data is recorded with an array of M receivers. In the following equations $x_m(t)$ represents seismic data from the receivers. The term $z_m$ represents the distance from the transmitter to a particular receiver.

As noted above, a semblance method involves comparing the similarity between acoustic waveforms recorded by an array of acoustic receivers. Semblance represents a measure of the potential presence of a first arrival in terms of slowness and travel time. Typically the similarities of the respective waveforms lie along a line having a particular slope. The line intersecting maximum similarities of the waveforms (i.e. having maximum coherence) defines the moveout or slowness of the waveforms. Semblance is the degree of coherence of the power distribution between the signals divided (normalized) by the total power of all signals. A matrix representing the parameters of travel time and slowness is shown in equation (1) below:

$$Semb(t, \Delta T) = \frac{\int_t^{t+Window} \left\{ \sum_{m=1}^{M} x_m(\Delta T * z_m + \tau) \right\}^2 d\tau}{\int_t^{t+Window} \sum_{m=1}^{M} x_m^2(\Delta T * z_m + \tau) d\tau}, \quad (1)$$

The terms of equation (1) are defined as follows: window is a time window, $\Delta T$ is slowness, and "t" is an arbitrary time from which to count an integration window in the time domain. Note that sums are substituted for the integrals. Further analysis aimed at defining velocity characteristics of the formation is carried out based on this matrix. The integral value of slowness $\Delta T$ (taking into account the data from all receivers) is typically determined from the maximal estimated values of $S_{emb}$ in a certain domain of arguments.

Figure 3:
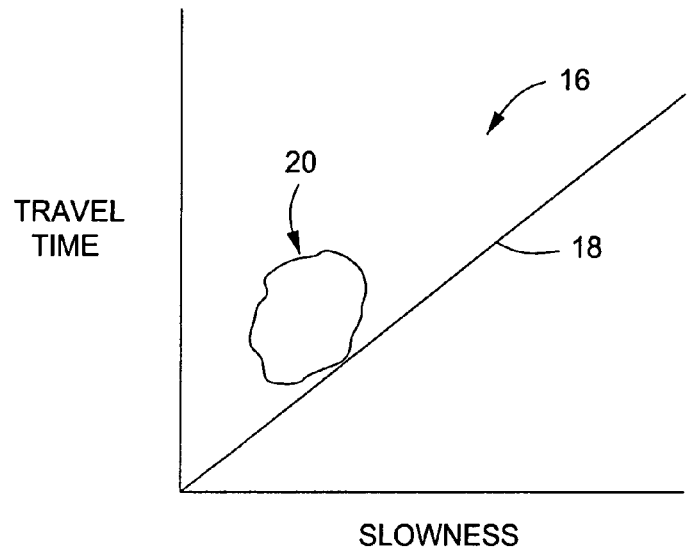
FIG. 3 depicts an example of a semblance plot.

FIG. 3 provides an example of processed data available by utilizing the semblance matrix Semb of equation (1). In this example a semblance plot 16 is shown having a semblance contour line 20 in conjunction with a tool line 18. As known, the tool line 18 is created based on the geometry of an associated tool and the arrangement and number of acoustic transducers associated with the tool. More specifically, a tool line is typically represented as a line on a graph that establishes functional (linear) relationship (correspondence) between travel time and slowness for a given tool geometry (i.e. distance along the tool axis between a source and a tool receiver. The semblance contour line 20 can be created by applying the semblance matrix to acoustic data (such as that represented by $x_m(t)$) received by an acoustic array. The first break of the "actual" acoustic data should be located within the semblance contour line 20. The term "actual" acoustic data is used to differentiate acoustic data representing an actual first arrival from "false data" that may represent a false first arrival.

Equation (1) an be rewritten into the following form which expresses the value of coherence more accurately:

$$Semb(t, \Delta T) = \frac{\left| \sum_{m=1}^{M} H[x_m(\Delta T * z_m + t)] \right|}{\sum_{m=1}^{M} |H[x_m(\Delta T * z_m + t)]|} \quad (2)$$

$$= \frac{\left| H\left[ \sum_{m=1}^{M} x_m(\Delta T * z_m + t) \right] \right|}{A(t, \Delta T)}$$

$$= \frac{|H[X(t, \Delta T)]|}{A(t, \Delta T)}.$$

It should be pointed out that Equation 2 employs a Hilbert transform (H[ ]) on some of the elements of Equation 1.

2. Phase Velocity Processing

Phase velocity processing (PVP) is another technique useful for identifying the first break (or first arrival) of an acoustic waveform; many specific methods are available for utilizing this technique. Like the semblance technique, the PVP technique processes acoustic data for identifying first arrivals. If the Semblance technique for PVP is applied, then a matrix (similar to equation (2)) may be formed:

$$X(t, \Delta T) = \sum_{m=1}^{M} x_m(\Delta T * z_m + t).$$

Figure 4:
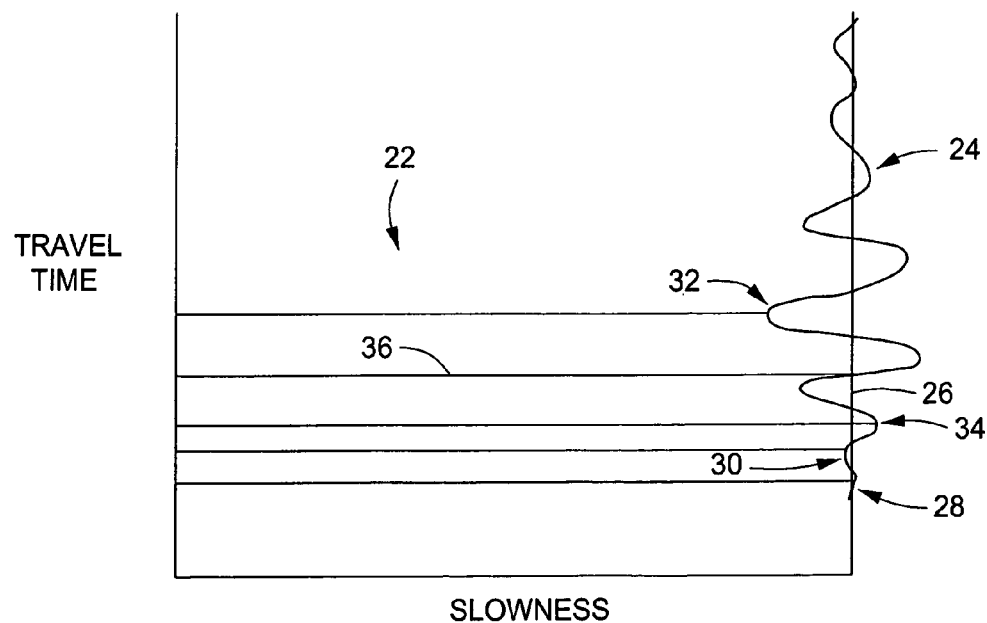
FIG. 4 is an example of a phase separation plot.

One possible product of utilizing a PVP technique is a phase separation plot, an example of which is shown in FIG. 4. The PVP technique along with the Semblance technique identifies various locations on a time domain waveform 24 (X(t, $\Delta T$=const)) that are in turn used for generating phase lines 36. The waveform 24 of FIG. 4 is shown for clarity to illustrate how the phase lines 36 correlate to the various locations on the waveform 24. For example, at various locations of the waveform 24 the phase lines 36 can be correlated to include a crossing location 28 (where the waveform 24 crosses its origin 26), a maximum 30 shown as a local maximum, a maximum 32 shown as an overall maximum, and a minimum 34 (which can be a local minimum or overall minimum).

One method of use of the PVP technique is based on converting acoustic waveforms into complex form using a Hilbert transform. Using the Hilbert transform converts the time domain waveform into two waveforms. One waveform is identical to the recorded realtime time domain waveform and the other has imaginary components. Combining the two waveforms provides the phase and magnitude of the recorded waveform. Wave arrivals can be computed by converting the wave data into processed data with the Hilbert transform; one example of a Hilbert transform computational formula is as follows:

$$\Phi(t, \Delta T) = \arctan\left( \frac{\mathrm{Im} H[X(t, \Delta T)]}{\mathrm{Re} H[X(t, \Delta T)]} \right). \quad (3)$$

Utilizing "π-boundaries" of $\Phi(t,\Delta T)$, a unitary matrix $\Phi_{+/-}(t, \Delta T)$ may be formed, which serves to identify phase zero-line crossings (e.g. from "−" to "+"). This matrix has the same dimensions as the matrix Semb(t,$\Delta T$) and can be presented simultaneously.

Figure 5:
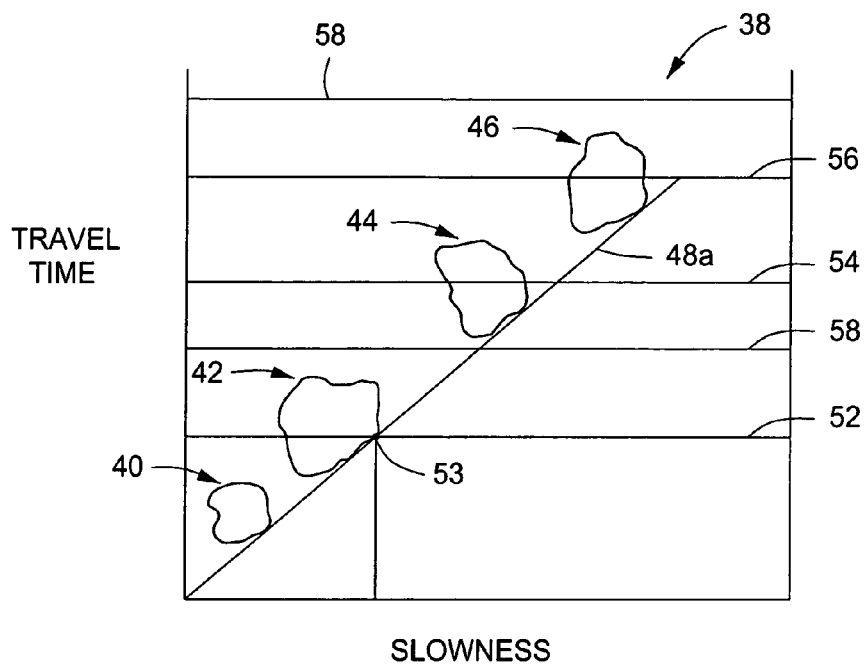
FIG. 5 illustrates an example of a combined semblance and phase separation plot.
Figure 6:
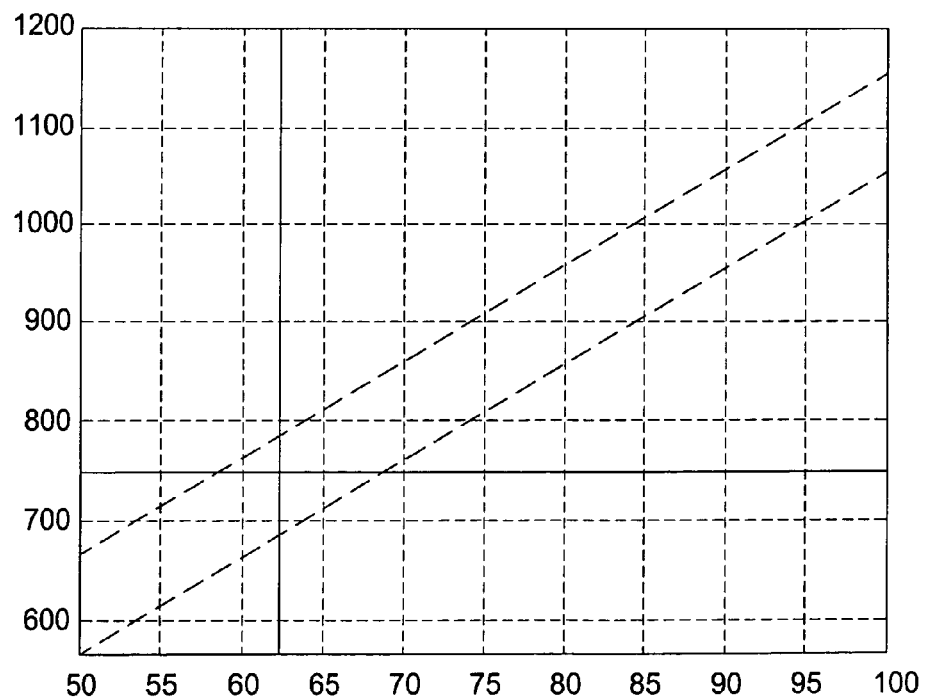
FIG. 6 is a plot of a matrix representing power coherence.

Combining semblance processing with PVP processing has shown to yield advantageous results. An example of such results is provided graphically FIG. 5 where a phase separation plot is combined with a semblance plot. One example of combining these techniques involves superimposing one of the plots onto the other. In the combined plot 38 of FIG. 5 various semblance contour plots are shown. For the purposes of example and illustration, FIG. 5 illustrates a semblance processing technique wherein four types of waveforms have been recorded, the modes illustrated include a false signal, a compressional wave mode, a shear wave mode, and a Stoneley wave mode. Accordingly four semblance contours were created from these recorded signals, those include; a false signal semblance plot 40, a compressional mode semblance plot 42, a shear mode semblance plot 44, and a Stoneley mode semblance plot 46. The semblance plots (40, 42, 44, and 46) are shown adjacent a tool line 48.

Also provided on the combined plot 38 of FIG. 5 are phase lines that intersect the semblance plots of FIG. 5. The recorded acoustic data used to produce the phase lines is limited to the data recorded by the receiver closest to the acoustic source. More specifically, the phase lines shown include a compressional phase line 52, a shear phase line 54, and a Stoneley phase line 56. Unaligned phase lines 58 are also included that represent phase lines that do not intersect with an acoustic signal waveform.

In one example of use of the technique herein described, intersection of the phase line with the closest semblance plot is considered (the false semblance plot is excluded by this portion of the analysis). In FIG. 5 the closest semblance plot is the compressional semblance plot 42. As shown, the compressional phase line 52 intersects with the compressional semblance plot 42 and crosses the tool line 48a at an intersection point 53. The x (abscissa) and y (ordinate) coordinates of the intersection point 53 yield corresponding values for both the arrival time and slowness. The arrival time and slowness determined by this technique are chosen to accurately describe the acoustic data recorded by the array of M receivers The following equation represents the combination of the semblance matrix and the phase velocity technique:

$$Semb_{+/-}(t, \Delta t) = Semb(t, \Delta t) * \Phi_{+/-}(t, \Delta t), \qquad (4)$$

The matrices Semb and $Semb_{+/-}$ enable a determination of slowness, as well as the first entry, more precisely and correctly. By mapping these matrices according to depth, their projections may be constructed. For visualization matrices Semb and $Semb_{+/-}$, when the third dimension—depth—is introduced, the following 1-D projections are suggested (in this case, by taking into account the depth provides two measures):

$$Pr_1(\Delta T) = \max_{ht_{min}+\Delta T*z_M \leq 1 \leq ht_{max}+\Delta T*z_M} Semb(t, \Delta T), \qquad (5)$$

and $$Pr_2(t) = \max_{(t-ht_{max})/z_M \leq \Delta T \leq (t-ht_{min})/z_M} Semb_{+/-}(t, \Delta T). \qquad (6)$$

An additional projection:

$$Pr_3(t) = \frac{1}{M} \max_{(t-ht_{max})/z_M \leq \Delta T \leq (t-ht_{min})/z_M} |H[X(t, \Delta T)]| > \delta, \qquad (7)$$

Figure 7:
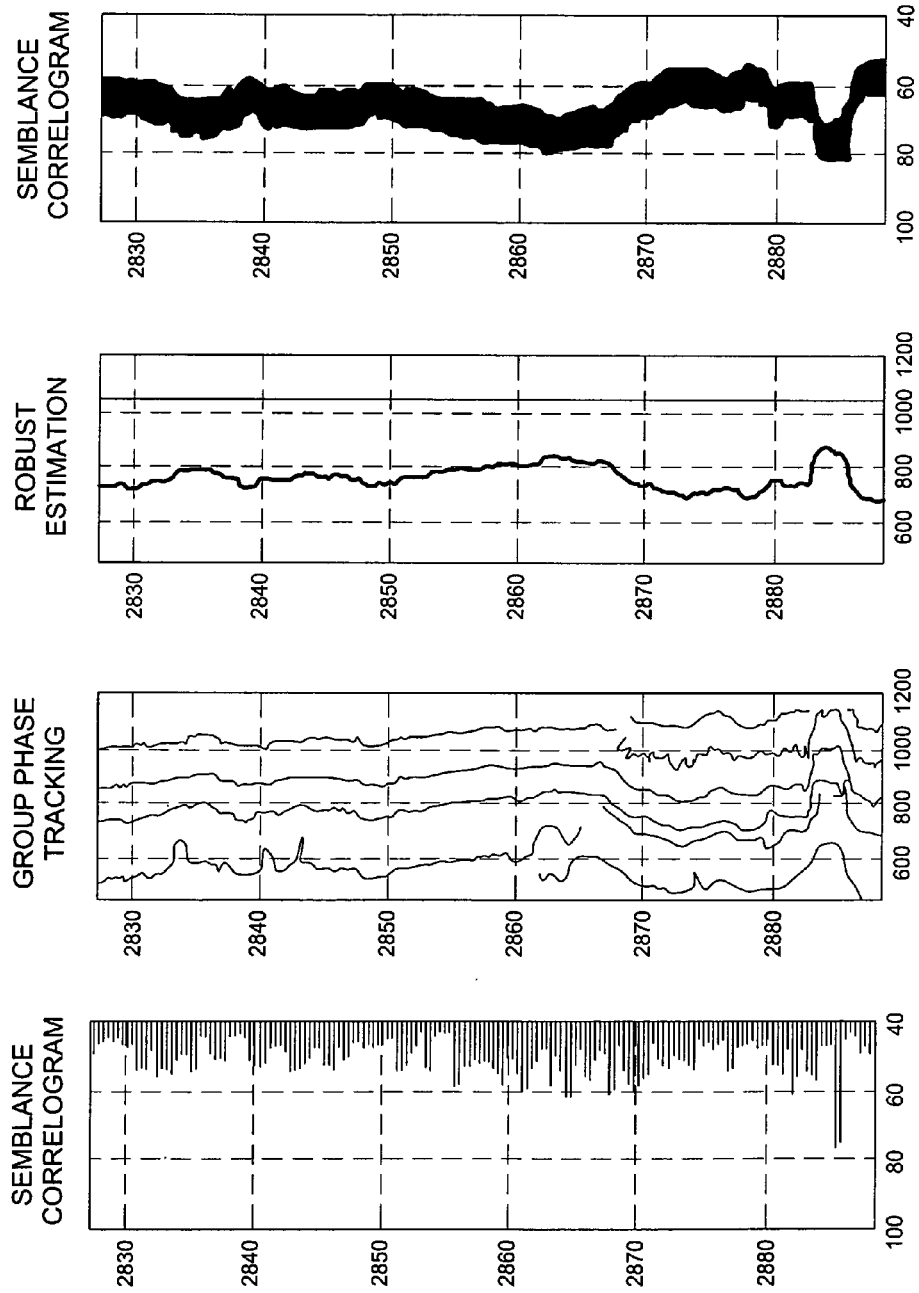
FIG. 7a is a slowness axis expressed as a correlogram.
FIG. 7b is a semblance projection expressed in terms of depth and travel time.
FIG. 7c is a projection on the travel time axis used for travel time estimation.
FIG. 7d is Hilbert semblance corridor.

Allows the ability make an initial estimation of Travel Time by using an assigned threshold δ. The former is the projection Semb, but the slowness axis may be expressed as a correlogram in the set of coordinates depth-slowness as shown in FIG. 7a.

Figure 8:
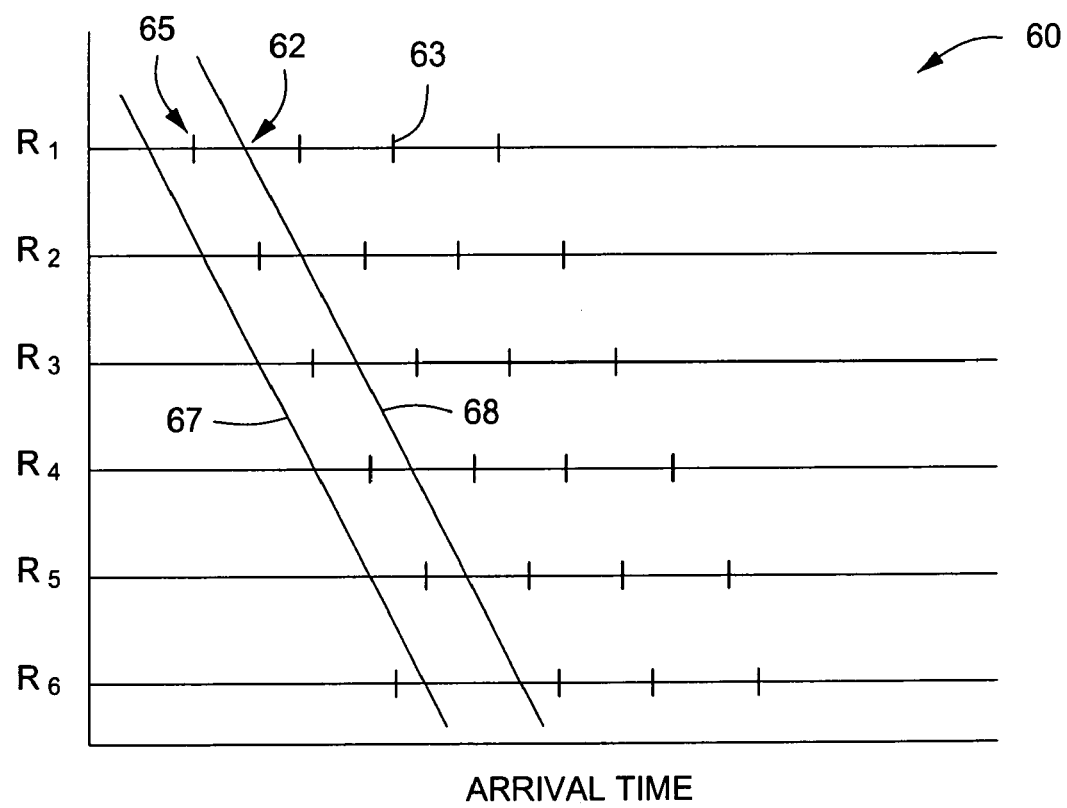
FIG. 8 is a plot representing a data filtering technique.

In an alternative embodiment, a filtering technique is employed for removing certain recorded data from consideration during data processing. FIG. 8 graphically illustrates an example of this procedure where acoustic data from six receivers ($R_1$-$R_6$). Here a phase separation plot 60 is created having the phase separation points 63 for waveforms recorded by each of the receivers. Boundary lines 62 are added to the plot 60 bounding the first phase separation point 65 of the first receiver ($R_1$) and creating a band therebetween. The value of the slope of the boundary lines 62 is substantially equal to the value of the slowness of the acoustic signal recorded by the receivers ($R_1$-$R_6$). The distance from the first phase separation point 65 to the left side boundary line 67 is substantially the same as the difference of the peak value of semblance and its relative maximum value. Similarly, the distance from first phase separation point 65 to the right side boundary line 68 is substantially the same as the difference of the peak value of semblance and its relative minimum value. In some instances a separation point for a receiver may not fall within the boundary lines 62. In situations like these, a semblance plot can be recreated, but without acoustic data recorded by the particular receiver having no separation points within the boundary lines 62. In the example of FIG. 8, no phase separation points of $R_6$ fall within the boundary lines 62, thus in the generation of a subsequent semblance plot, no data from this receiver would be included.

Figure 1:
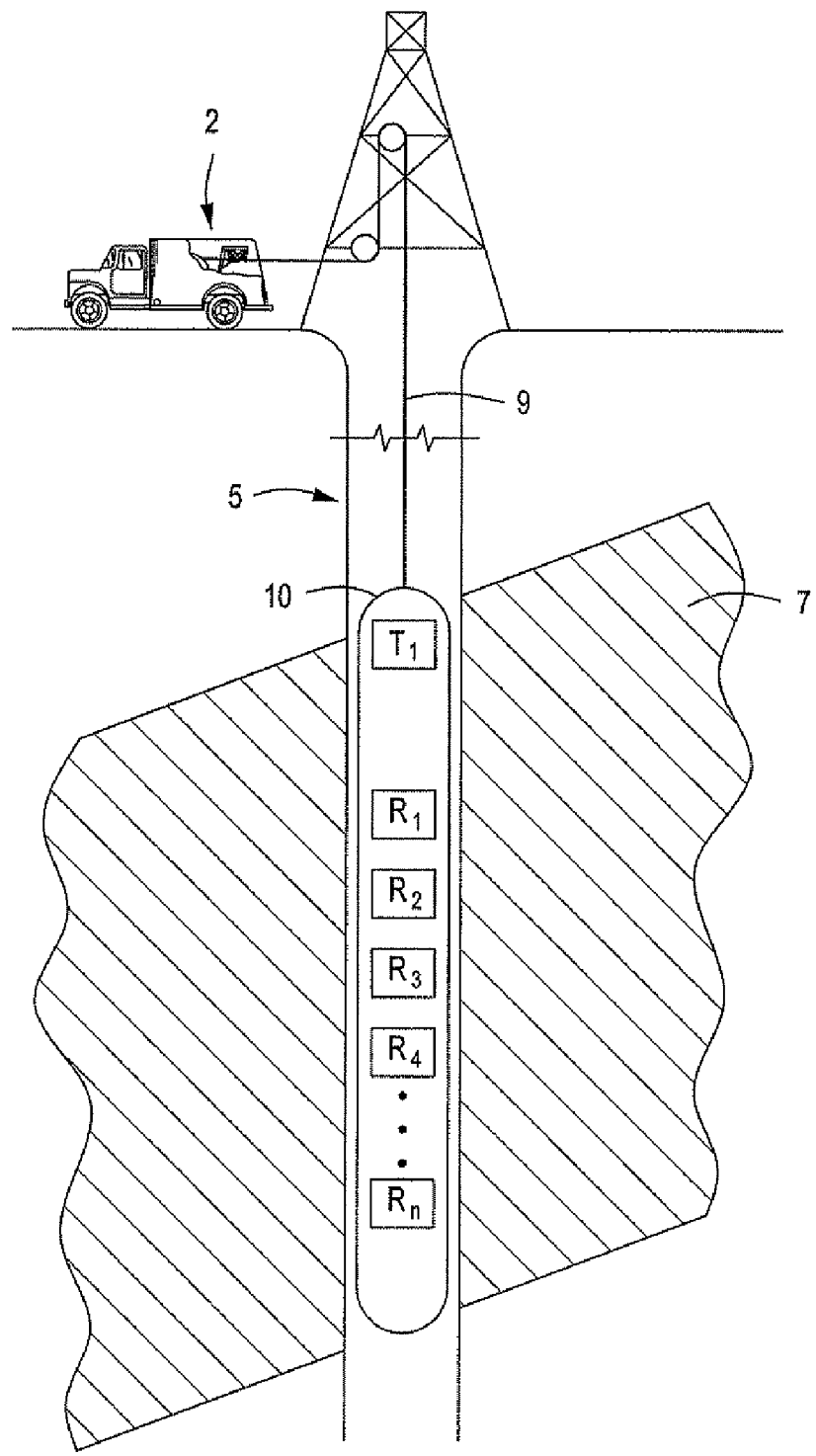
FIG. 1 illustrates an acoustic tool disposed within a wellbore.
Figure 2:
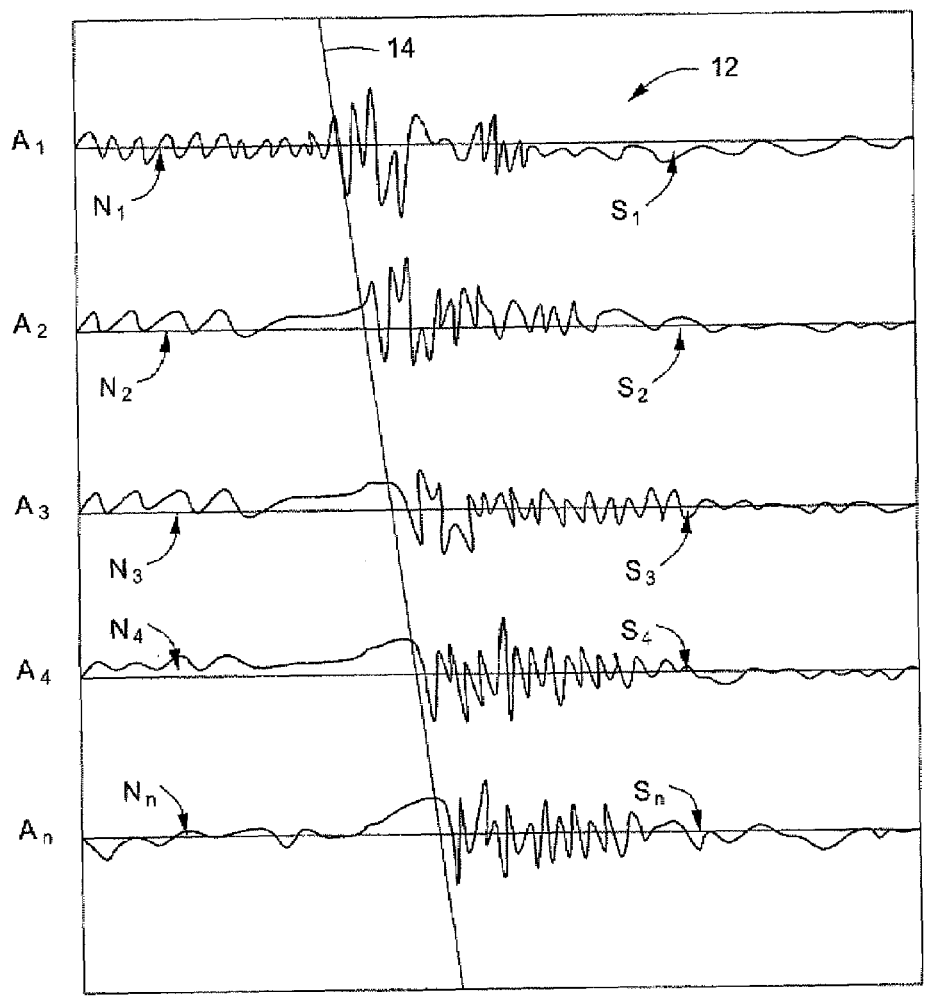
FIG. 2 portrays a series of acoustic waveforms.

In one non-limiting example of use of the technique described herein acoustic waves, such as those illustrated in FIG. 2, are recorded by a receiver array comprising M receivers ($R_1$, $R_2$, $R_3$, $R_4$, . . . , $R_M$). A semblance process is then performed using the data recorded from the receivers. Phase lines, as shown in FIG. 4, are created solely from the acoustic wave received by the receiver closest to the source. In the configuration shown in FIG. 1, the particular receiver from which phase lines are created is $R_1$. Any now known or later developed method of forming a semblance plot or phase velocity process is considered within the scope of this example. The semblance contour closest to the ordinate is identified and the phase line plot is combined with the semblance plot. If a phase line intersects the closest semblance plot, the point where the intersecting phase line crosses the tool line is noted. That intersecting point is then used to obtain an optimum value of travel time and slowness for accurately evaluating the waveforms recorded by the receiver array. If no phase lines intersect the closest semblance plot, a line parallel to the abscissa (the Slowness axis) can be drawn from the point of maximum semblance within the closest plot to the tool line. Thus when no phase lines intersect the closest semblance plot, the point where the parallel line intersects the tool line can be taken as the optimum evaluation point. For further refinement of analysis results, the filtering technique illustrated in FIG. 8 may be employed.

Figure 9:
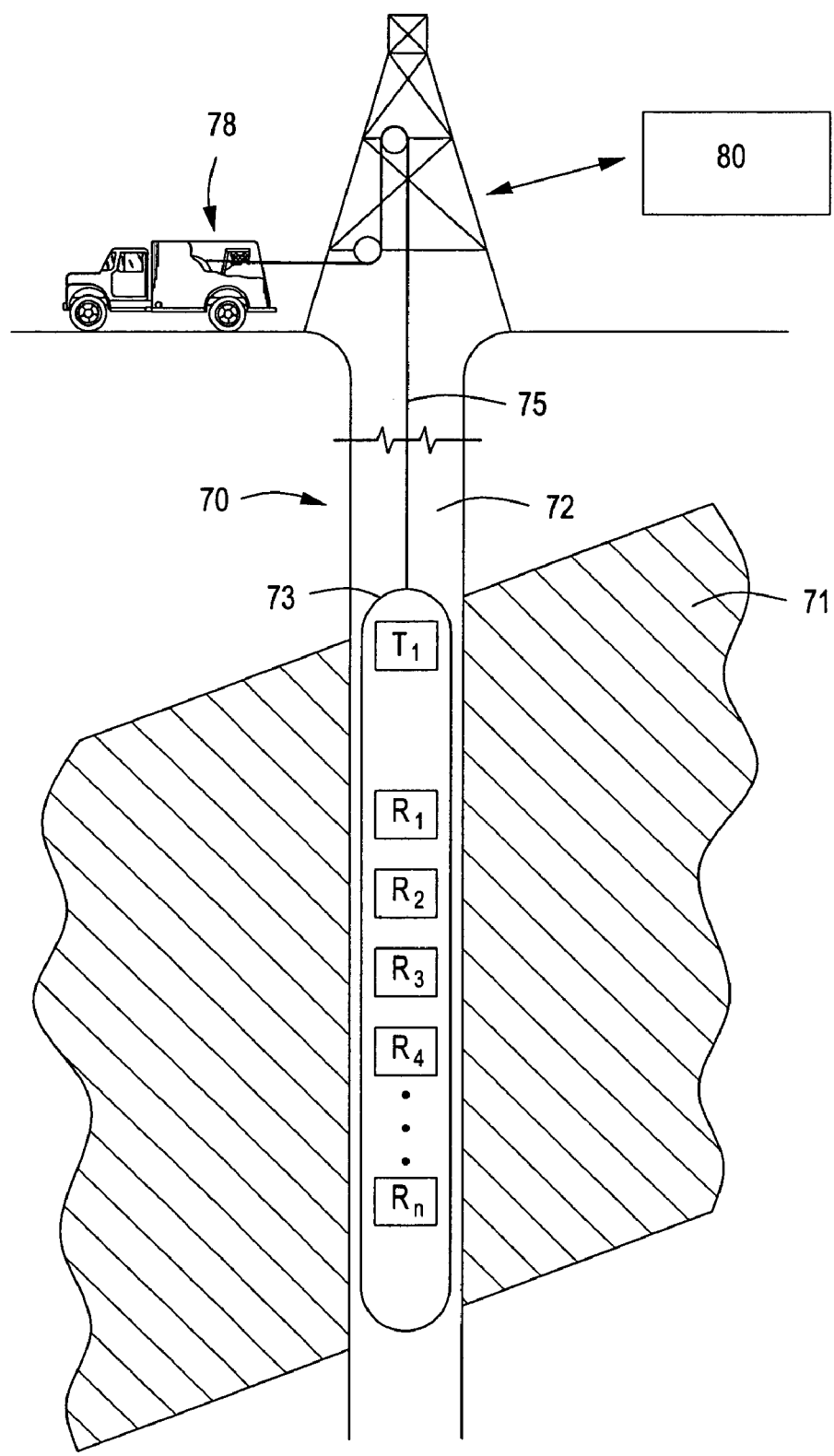
FIG. 9 illustrates in a partial cut-away side view, an embodiment of an acoustic analyzer system.

In FIG. 9 an embodiment of an acoustic analyzer system 70 for recording acoustic signals is shown. In the embodiment shown, the system 70 comprises a downhole tool 73 disposed in a wellbore 72 on wireline 75. The wellbore 72 pierces a formation 71. The downhole tool 73 is equipped with receivers ($R_1$-$R_n$) configured to receive acoustic signals (data) that have passed through the formation 71. The tool 73 may also include a transmitter $T_1$ configured to create and emit the acoustic signals into the formation 71 that are then received by the receivers ($R_1$-$R_n$).

The recorded acoustic signals may be stored within the downhole tool 73 for later analysis or can be transmitted to the surface, such as via wireline 75, for realtime analysis. The analysis considered includes the steps and methods described above, including the steps and methods that comprise creating a semblance (including a coherence) plot, a phase separation plot, a tool line, as well as determining moveout, the first break, and slowness. An analyzer may be employed that is specifically configured to perform said analysis steps used in conjunction with the recorded acoustic signals. The analyzer may be disposed with the downhole tool 73 or otherwise disposable within the wellbore 72. Optionally, the analyzer may be solely at the surface such as in a surface truck 78.

One specific example of an analyzer is an information handling system (IHS) 80. An IHS may be employed for controlling the generation of the acoustic signal herein described as well as receiving the controlling the subsequent recording of the signal(s). Moreover, the IHS may also be used to store recorded data as well as processing the data into a readable format. The IHS may be disposed at the surface, in the wellbore, or partially above and below the surface. The IHS may include a processor, memory accessible by the processor, nonvolatile storage area accessible by the processor, and logics for performing each of the steps above described.

The present invention described herein, therefore, is well adapted to carry out the objects and attain the ends and advantages mentioned, as well as others inherent therein. While a presently preferred embodiment has been given for purposes of disclosure, numerous changes exist in the details of procedures for accomplishing the desired results. For example, the device and method can be used in conjunction with downhole drilling or other boring operations. Additionally, the acoustic waves or acoustic data can comprise compressional waves, shear waves, Raleigh waves, Stoneley waves and combinations thereof. These and other similar modifications will readily suggest themselves to those skilled in the art, and are intended to be encompassed within the spirit of the present invention disclosed herein and the scope of the appended claims.

What is claimed is:

1. A method of investigating a subterranean formation comprising:
   recording acoustic waves from within the formation with a downhole tool;
   forming a tool line representing the downhole tool;
   creating a semblance plot based on the recorded waves;
   generating a phase separation plot comprising a time domain waveform and a correlated phase separation line; and
   identifying the first break by combining the phase line plot, tool line, and the semblance plot.

2. The method of claim 1 further comprising defining a slowness value for the recorded waves based on the first break value.

3. The method of claim 1, wherein the semblance plot is a function of slowness and travel time.

4. The method of claim 1, wherein the semblance plot comprises a closest semblance contour and wherein the phase separation plot comprises a phase separation line.

5. The method of claim 4 further comprising identifying an intersection of a phase separation line and the closest semblance contour.

6. The method of claim 5, further comprising locating the crossing point of the phase separation line of claim 5 and a tool line.

7. The method of claim 6, wherein the crossing point identifies an arrival time and slowness for the measured acoustic waves.

8. The method of claim 1 where the acoustic waves are selected from the list consisting of compressional waves, shear waves, Raleigh waves, Stoneley waves and combinations thereof.

9. The method of claim 1 further comprising, transmitting acoustic waves into the formation.

10. The method of claim 9 wherein the step of transmitting the acoustic wave is performed by inserting a sonde having a transmitter into a wellbore formed in the formation and activating the transmitter.

11. The method of claim 10 further comprising adding receivers to the sonde for recording the acoustic waves.

12. The method of claim 1 further comprising performing a Hilbert transform on the recorded data.

13. The method of claim 1 further comprising, identifying a false first arrival.

14. The method of claim 1 wherein the step of generating a phase separation plot comprises identifying a location on the recorded acoustic wave wherein the location is selected from the list consisting of a maximum, a minimum, and a crossing point.

15. The method of claim 1 wherein the step of recording the acoustic waves is conducting while drilling.

16. The method of claim 1 further comprising, filtering the recorded acoustic waves, wherein the acoustic waves are recorded by a receiver array.

17. The method of claim 16, wherein the step of filtering comprises generating a band that bounds the first phase separation points recorded by the receiver array and discarding recorded data from a particular array whose first phase separation point falls outside of the band.

18. A method of determining the first break of acoustic data comprising:
   creating a plot comprising a semblance plot with the acoustic data, wherein the semblance plot comprises a closest semblance contour;
   adding a tool line representative of an apparatus used to record the acoustic data;
   creating a phase separation plot with the recorded data, wherein the phase separation plot comprises a phase separation line;
   combining the semblance plot, the tool line, and the phase separation plot;
   identifying an intersection of a phase separation line and the closest semblance contour; and
   identifying a crossing point of the tool line with the phase separation line that intersects the closest semblance contour, wherein the crossing point denotes the first break.

19. The method of claim 18 further comprising creating the semblance plot using a Hilbert transform.

20. The method of claim 18 further comprising determining the arrival time based on the crossing point.

21. The method of claim 18 further comprising determining the slowness based on the crossing point.

22. The method of claim 18 wherein the acoustic data is selected from the list consisting of compressional waves, shear waves, Raleigh waves, Stoneley waves and combinations thereof.

23. An acoustic analyzer system comprising:
   a downhole tool disposable into a wellbore tubular;
   a transmitter;
   a receiver; and an analyzer configured to process data received by the receiver by creating a semblance plot based on the received data, generating a phase separation plot comprising a time domain waveform and a correlated phase separation line, generating a tool line based on the downhole tool, and identifying the first break by combining the phase line plot, tool line, and the semblance plot.

24. The acoustic analyzer system of claim 23, wherein the analyzer comprises an information handling system.

25. The acoustic analyzer system of claim 23 wherein the transmitter creates Stonely waves.

26. The acoustic analyzer system of claim 23, wherein the transmitter and receiver are in the same unit.

27. The acoustic analyzer system of claim 23 wherein the analyzer is configured to create a tool line representative of the downhole tool.

28. The acoustic analyzer system of claim 27 wherein the analyzer is further configured to combine the tool line with the combined phase line and coherence plot.

* * * * *